(12) United States Patent
Vanderveen et al.

(10) Patent No.: US 12,260,377 B2
(45) Date of Patent: Mar. 25, 2025

(54) VEHICLE SERVICE AUTHORIZATION

(71) Applicant: BlackBerry Limited, Waterloo (CA)

(72) Inventors: Michaela Vanderveen, Tracy, CA (US); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 509 days.

(21) Appl. No.: 16/988,161

(22) Filed: Aug. 7, 2020

(65) Prior Publication Data
US 2022/0044207 A1 Feb. 10, 2022

(51) Int. Cl.
G06Q 10/20 (2023.01)

(52) U.S. Cl.
CPC .................. G06Q 10/20 (2013.01)

(58) Field of Classification Search
CPC ........................................ G06Q 10/20
See application file for complete search history.

(56) References Cited

U.S. PATENT DOCUMENTS

| | | | |
|---|---|---|---|
| 6,240,365 B1 | 5/2001 | Bunn | |
| 6,718,240 B1 | 4/2004 | Suda | |
| 6,842,762 B2 | 1/2005 | Raithel | |
| 7,325,135 B2 | 1/2008 | Fehr et al. | |
| 9,805,519 B2 | 10/2017 | Ramanujam | |
| 10,377,345 B1 | 8/2019 | Oesterling | |
| 10,489,132 B1 | 11/2019 | Bloomcamp | |
| 10,719,813 B1 * | 7/2020 | Beckmann | G06Q 10/20 |
| 11,423,708 B2 * | 8/2022 | Mezaael | H04W 4/44 |
| 11,551,181 B2 * | 1/2023 | Drummond Doig | G06Q 10/0833 |
| 11,763,269 B1 * | 9/2023 | Beckmann | G06Q 10/20 705/40 |
| 11,783,302 B2 * | 10/2023 | Vanderveen | G06Q 10/06311 705/305 |
| 11,922,734 B1 * | 3/2024 | Kellett | G07C 5/085 |
| 2007/0160206 A1 | 7/2007 | Ostrander | |
| 2009/0049057 A1 * | 2/2009 | Ghani | G06Q 30/02 |
| 2010/0036599 A1 * | 2/2010 | Froeberg | G01C 21/3461 701/532 |
| 2010/0131304 A1 | 5/2010 | Collopy | |
| 2011/0087505 A1 | 4/2011 | Terlep | |
| 2012/0313796 A1 | 12/2012 | Lee | |
| 2013/0158777 A1 | 6/2013 | Brauer | |
| 2013/0206495 A1 | 8/2013 | Westbrook | |

(Continued)

FOREIGN PATENT DOCUMENTS

| | | | | |
|---|---|---|---|---|
| CA | 2566998 A1 * | 6/2007 | | G06Q 30/00 |
| CA | 3039675 A1 * | 4/2018 | | H04L 12/4625 |

(Continued)

OTHER PUBLICATIONS

Fred Lambert "Tesla launces a new car-sharing feature to simplify access" Jun. 9, 2020 https://electrek.co/2020/06/09/tesla-new-car-sharing-feature-access/ (Year: 2020).*

(Continued)

*Primary Examiner* — Gerardo Araque, Jr.
(74) *Attorney, Agent, or Firm* — Trop Pruner & Hu, P.C.

(57) ABSTRACT

In some examples, a system determines a context relating to a requested service of a vehicle, the context comprising information of a location related to the vehicle. The system authorizes the requested service based on the determined context.

9 Claims, 5 Drawing Sheets

(56) References Cited

U.S. PATENT DOCUMENTS

| | | | |
|---|---|---|---|
| 2013/0214902 | A1 | 8/2013 | Pineau et al. |
| 2013/0219170 | A1 | 8/2013 | Naitou |
| 2014/0019280 | A1 | 1/2014 | Medeiros et al. |
| 2015/0348335 | A1 | 12/2015 | Ramanujam |
| 2017/0134885 | A1 | 5/2017 | Lortz et al. |
| 2017/0305368 | A1 | 10/2017 | Markham |
| 2017/0310674 | A1 | 10/2017 | Markham |
| 2019/0228383 | A1* | 7/2019 | Abler ............... G07C 5/008 |
| 2019/0274018 | A1 | 9/2019 | Mosenia |
| 2020/0079319 | A1* | 3/2020 | Zeryihun ............ B60R 21/01 |
| 2020/0171944 | A1 | 6/2020 | Hanna |
| 2020/0202636 | A1* | 6/2020 | Andres ............. G06Q 50/30 |
| 2024/0104489 | A1* | 3/2024 | Doig ............. G06Q 10/0833 |
| 2024/0153321 | A1* | 5/2024 | Kellett ............. G07C 5/008 |
| 2024/0275613 | A1* | 8/2024 | Russell ............ H04L 9/3247 |

FOREIGN PATENT DOCUMENTS

| | | | |
|---|---|---|---|
| CN | 103886657 | A | 6/2014 |
| CN | 108234282 | A | 6/2018 |
| CN | 110061984 | A | 7/2019 |
| DE | 202012009432 | U1 | 10/2012 |
| EP | 1669857 | A1 | 6/2006 |
| GB | 2565147 | A | 2/2019 |
| KR | 20180062072 | A | 8/2016 |
| WO | 2005/081650 | A2 | 9/2005 |
| WO | 2006122263 | A2 | 11/2006 |
| WO | 2019040651 | A1 | 2/2019 |

OTHER PUBLICATIONS

Anonymous "10 Innovative Use Cases of IoT in the Transport and Logistics Sector," M2 Presswire, pp. NA, 2018 (Year: 2018).*
Anonymous "Featured New Products," Professional Tool & Equipment News, vol. 31, (2), pp. 10-12,14, 16-20,24-26, Mar. 2020 (Year: 2020).*
K. Schurman, "The best OBDII scanner," BestReviews, pp. n/a, Sep. 10, 2019 (Year: 2019).*
Lucas Merian "Verizon unveils aftermarket vehicle diagnostics service" Jan. 13, 2015 https://www.computerworld.com/article/2868475/verizon-unveils-aftermarket-vehicle-diagnostics-service.html (Year: 2015).*
Alex E "How to Install ELM327 WIFI OBD Scanner on Android/Apple IOS", Oct. 2014 http://www.totalcardiagnostics.com/support/Knowledgebase/Article/View/77/0/how-to-install-elm327-wifi-obd-scanner-on-androidapple-ios (Year: 2014).*
Bartanen, J. (2017). Diagnostic navigation. Automotive Body Repair Network, 56(6), 58-62. (Year: 2017).*
Stout, M. (Jan. 9, 2020). Fight over car repair rules arises—again: Echoing 2012 battle, both sides say they'll spend what they must to win. Boston Globe (Year: 2020).*
D. Eastlake, Internet Engineering Task Force (IETF), Request for Comments: 6066, Obsoletes: 4366, Category: Standards Track, ISSN: 2070-1721, Transport Layer Security (TLS) Extensions: Extension Definitions, Jan. 2011 (25 pages).
D. Hardt, Internet Engineering Task Force (IETF), Request for Comments: 6749, Obsoletes: 5849, Category: Standards Track, ISSN: 2070-1721, The OAuth 2.0 Authorization Framework, Oct. 2012 (76 pages).
IEEE Standard for Wireless Access in Vehicular Environments—Security Services for Applications and Management Messages, IEEE Vehicular Technology Society, IEEE Std 1609.2™-2016 (Revision of IEEE Std 1609.2-2013) (241 pages).
Crackberry, BlackBerry unveils new Spark 'Enterprise of Things' platform, Sep. 12, 2018 (6 pages).
Blackberry, Blackberry Intelligent Security—Product Overview, Nov. 2019 (13 pages).
Blackberry, Datasheet, CylancePERSONA, Feb. 20, 2020 (4 pages).
W3C, Vehicle Information Service Specification, W3C Editor's Draft, Jan. 7, 2020 (65 pages).
Yun et al., Enabling Safe & Secure Connection to an In-vehicle Network (IVN), IEEE, 2014 (2 pages).
Mehra et al., Secure Remote Diagnostics of a Vehicle Using UGP, IEEE, 2017 (6 pages).
Kharche et al., UDS Implemetation for ECU I/O Testing, 2018 3rd International Conference on Intelligent Transportation Engineering, IEEE 2018 (4 pages).
Autointegrate.com, Repair authorization for fleet management, Improving Fleet Management downloaded May 26, 2020 (10 pages).
Robinson, Jessie, Streamlining the Maintenance Authorization Process, Apr. 24, 2018 (10 pages).
Vanderveen et al., U.S. Appl. No. 16/868,808 entitled Authorization of Vehicle Repairs, filed May 7, 2020 (53 pages).
European Patent Office, Extended European Search Report for Appl. No. 21174627.6 dated Oct. 22, 2021 (59 pages).
Manfred Klaus, Plan.Net, Auto 2020: A Smartphone on wheels, Sep. 11, 2017 (translated by Google Translation) (8 pages).
Wikipedia, Connected car last edited Jul. 27, 2020 (11 pages).
Intoxalock, "Car Repair and Maintenance with an Intoxalock Ignition Interlock Device Installed", https://www.intoxalock.com/blog/author/intoxalock, Nov. 20, 2018 (Year: 2018) (3 pages).
Draeger Interlock, Inc., "Ignition Interlock System—User Manual", www.ignitioninterlock.com, 2002 (Year: 2002) (18 pages).
Mitch Becker, "Vehicle Ignition Interlock Devices: What You Need to Know", https://www.bodyshopbusiness.com/vehicle-ignition-interlock-devices-what-you-need-to-know/, Mar. 7, 2011 (Year: 2011) (11 pages).
M. Steger et al., "An Efficient and Secure Automotive Wireless Software Update Framework," in IEEE Transactions on Industrial Informatics, vol. 14, No. 5, May 2018, pp. 2181-2193.
Philipp Mundhenk, Andrew Paverd, Artur Mrowca, Sebastian Steinhorst, Martin Lukasiewycz, Suhaib A. Fahmy, and Samarjit Chakraborty. 2017, Security in Automotive Networks: Lightweight Authentication and Authorization. ACM Trans. Des. Autom. Electron. Syst. 22, 2, Article 25 (Apr. 2017), 27 pages (Year: 2017).
T. Kim and S. Park, "Compare of Vehicle Management over the Air and On-Board Diagnostics," 2019 International Symposium on Intelligent Signal Processing and Communication Systems (ISPACS), 2019, pp. 1-2 (Year: 2019).
Canadian Patent Office, Office Action for Appl. No. 3,119,419 dated Oct. 20, 2023 (4 pages).
European Patent Office, Communication pursuant to Article 94(3) EPC for Appl. No. 21174627.6 dated Jul. 12, 2023 (5 pages).

* cited by examiner

VEHICLE SERVICE AUTHORIZATION

BACKGROUND

An operator of a vehicle may bring the vehicle to a repair facility to perform maintenance and/or repair on the vehicle. The nature of the work to be performed on the vehicle is typically agreed to verbally or via signature on a physical document at the repair facility. The vehicle operator's verbal agreement or signed acknowledgment provides the authorization for the repair facility to perform the work.

In some cases, the manufacturer of the vehicle may suggest services to be performed on the vehicle. The suggested services can be part of a recall campaign, a regularly scheduled maintenance, or any other type of service that the manufacturer deems should be performed on the vehicle.

When the vehicle's operator takes the vehicle to the repair facility, the vehicle's operator and the repair facility will discuss the services to be performed on the vehicle, and after the vehicle operator has given a verbal approval or approval by signing a physical document, the repair facility proceeds to perform the services on the vehicle.

BRIEF DESCRIPTION OF THE DRAWINGS

Some implementations of the present disclosure are described with respect to the following figures.

Figure 1:
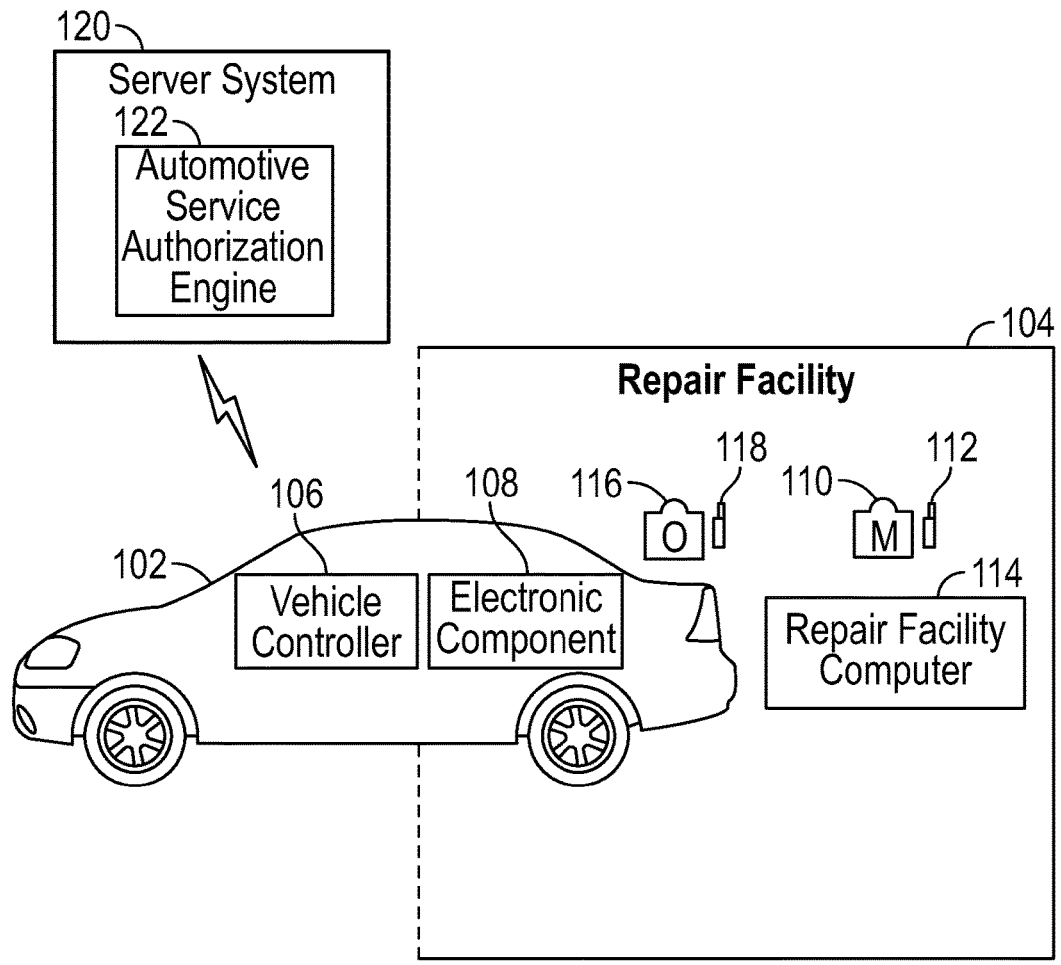
FIG. 1 is a block diagram of an example arrangement that includes a vehicle, a repair facility, and a server system, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), bicycles and other types of vehicles including any combinations of any of the foregoing, whether currently existing or after arising.

An automotive service can be performed on a vehicle. Examples of an automotive service can include any or some combination of the following: a repair of the vehicle, a maintenance of the vehicle (such as scheduled maintenance when the vehicle is brought into a repair facility for inspection to identify any components that have to be serviced or replaced), diagnostics of the vehicle (which can involve a visual inspection and/or a computer-based inspection of the vehicle), and an update of a program (e.g., software and/or firmware) of the vehicle, or any other type of service in which the vehicle is to be inspected, modified, and/or updated.

It can be difficult to determine whether there is an authorization for any specific automotive service for a given vehicle. For example, a requested automotive service may not be from an authorized person, such as in cases where the person that is requesting the automotive service is impersonating the owner of the vehicle. In other cases, a repair facility may not be legitimate and may not be authorized to perform the automotive service.

An "operator" of a vehicle can refer to an owner of the vehicle or a driver of the vehicle or any other person that is to make a decision regarding an automotive service to be performed on the vehicle.

A "repair facility" can refer to any facility that can perform an automotive service on a vehicle, where the automotive service can include a repair or replacement of a malfunctioning part of the vehicle, or a maintenance of the vehicle to keep the vehicle in good working condition. A repair facility can be a facility at a vehicle dealer, or a facility that is separate from the vehicle dealer.

Moreover, after a vehicle's operator has given authorization (either verbally or in written form) to a repair facility to perform an automotive service on a vehicle, the operator has no way to determine or verify that the automotive service performed by the repair facility was an automotive service authorized or was an automotive service that is approved by a manufacturer of the vehicle. For example, the repair facility may claim to perform a given automotive service for the vehicle, and then seek reimbursement from a manufacturer of the vehicle, while actually not having performed the warranty service.

It is also possible that an operator of the vehicle may deny having authorized a particular automotive service, such as to being displeased with the repair facility. As a result, the vehicle manufacturer may not be able to determine whether the vehicle manufacturer should pay for a warranty service. Alternatively, if the automotive service is not in warranty and payment is the responsibility of the vehicle's operator, the operator may deny having authorized the repair or an additional repair that resulted in an increase in the original estimated cost.

In accordance with some implementations of the present disclosure, techniques or mechanisms are provided to authorize an automotive service on a vehicle based on a context relating to the requested automotive service of the vehicle, and/or based on use of a second factor authentication.

FIG. 1 is a block diagram of an example arrangement in which a vehicle 102 has been brought into a repair facility 104 for performing an automotive service. Although used in the singular sense, an "automotive service" can include one or more service actions on the vehicle, including any or some combination of repair, maintenance, program update, diagnostics, and so forth. In other examples, an automotive service may not be performed at the repair facility 104. For example, the automotive service can be performed at the home of the vehicle's operator, at a work location of the vehicle's operator, or at any other specified location. In addition, in cases where the automotive service includes a program update, the program update can be performed remotely over a network, such as a wireless network or a wired network. In such cases, the vehicle 102 may be located at any location.

The vehicle 102 includes a vehicle controller 106 that can control various electronic components (an electronic component 108 is shown in FIG. 1) of the vehicle 102, and that has external connectivity (e.g., a Telematics Control Unit and/or a gateway). As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The electronic component 108 may include any of various different types of electronic components. Examples of electronic components include Electronic Control Units (ECUs) or other types of electronic components. For example, the electronic component 108 can include a port that can be used by an external entity, such as a mechanic's handheld device 112 under the control of a mechanic 110 at the repair facility 104, to access data and further electronic components of the vehicle 102. As an example, the port can include an on-board diagnostics (OBD-II) port, which the mechanic 110 can use to access the data and/or further electronic components of the vehicle 102, via their device 112. For example, the mechanic 110 can use the handheld device 112, such as an OBD handheld scanner or other type of handheld electronic device (e.g., a smart phone, etc.) to connect to the OBD port (108) to communicate with the vehicle 102. In some examples, the OBD port can include an OBD-II port. In other examples, other types of ports can be employed.

The data that can be accessed by the mechanic 110 through an OBD port (108) can include diagnostic data that can indicate which component(s) of the vehicle 102 is (are) malfunctioning or has (have) to be serviced as part of regular maintenance. The OBD port can also be used by the mechanic 110 to initiate diagnostics at the vehicle 102, such as to run tests at the vehicle 102 for determining which component(s) may be malfunctioning. The OBD port can also be used by the mechanic 110 to communicate or interact with further electronic components of the vehicle, such as ECUs for various subsystems (e.g., an engine, a transmission, a brake, etc.) of the vehicle 102.

In further examples, instead of or in addition to using the handheld electronic device 112 to access the electronic component 108 (e.g., a port), the mechanic 110 can use a repair facility computer 114 to connect to the electronic component 108 to establish communications with the vehicle 102.

FIG. 1 further depicts an operator 116 of the vehicle 102. The operator 116 has a handheld electronic device 118, such as a smart phone or other type of handheld electronic device. In some cases, the operator 116 can include the owner of the vehicle 102. In other examples, the operator 116 can include a different person (e.g., a driver or another person). In the latter examples, the owner can be remotely located from the repair facility 104, but the vehicle controller 106 may be able to communicate with the remote owner (or more specifically, an electronic device associated with the remote owner) over a network, such as a wireless network.

FIG. 1 further shows a server system 120, which can include a computer (or an arrangement of multiple computers). As an example, the server system 120 may be operated by a vehicle manufacturer. In other examples, the server system 120 may be operated by a different entity, such as a third party engaged by the vehicle manufacturer to authorize automotive services, or another entity.

The server system 120 is able to communicate over a wireless network with the vehicle controller 106. In some examples, the server system 120 can be part of a cloud, a web server, and so forth.

For example, if the vehicle controller 106 includes a Telematics Control Unit, then the Telematics Control Unit can communicate with the cloud (e.g., the Telematics Control Unit can receive information from the cloud to cause opening of an OBD-II port that may be part of the electornic component 108). Also, in some examples, the Telematics Control Unit can communicate with the electronic component 108 through a central gateway (not shown).

The server system 120 includes an automotive service authorization engine 122 to authorize an automotive service to be performed on a vehicle, such as the vehicle 102.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

1. Context-Based Authentication

Figure 2:
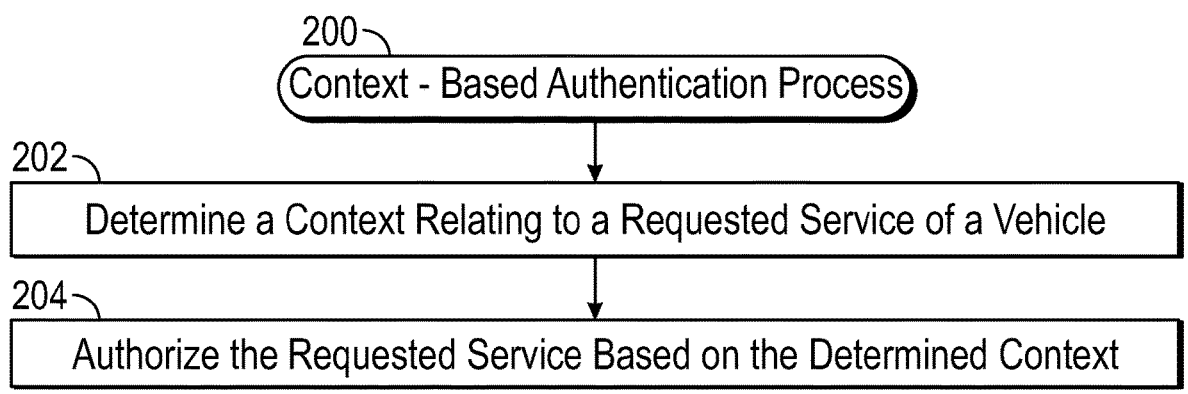
FIGS. 2 and 3 are flow diagrams of processes of a server system, according to some implementations of the present disclosure.

FIG. 2 is a flow diagram of a context-based authentication process 200 performed by the automotive service authorization engine 122. The automotive service authorization engine 122 determines (at 202) a context relating to a requested service of a vehicle. The determination of the context allows for a check based on the expected context of the automotive service. In some examples, the context includes information of a location related to the vehicle, in addition to other information listed further below.

The automotive service authorization engine 122 authorizes (at 204) the requested service based on the determined context. The authorization can include the automotive service authorization engine 122 sending authorization information, over a network, to the vehicle 102 and possibly to the repair facility 104.

Authorization information indicating approval of performance of an automotive service can include a specific unique identifier of the automotive service, a description of the automotive service, a list of affected electronic component(s) in the vehicle 102, or any other information that is useable to make a determination of what automotive service is being referred to. For example, the authorization information can be in the form of one or more authorization tokens. An authorization token or more generally a security token, sometimes also referred to as an access token, can be a digital data element associated with any of the following protocols: OAuth 2.0, OpenID, Secure Token Service (STS) based on SAML (Secure Assertion Markup Language), other security tokens as in Amazon web services Secure Token Service (STS), and so forth.

Information associated with an automotive service may contain an identifier of the software or firmware code and/or an identifier of a regulation, law or standard with which this automotive service aims to achieve compliance for that vehicle. For example, an automotive service may apply a software or firmware patch to comply with a regulation, law or standard. A software or firmware patch refers to machine-readable instructions that can be used to repair or replace software or firmware code in the vehicle. The regulation may be for all vehicles by a regulatory agency, or it may be just for that vehicle and a particular operator, by law enforcement agency (e.g., a breathalyzer installed per court order).

In response to the authorization information, the vehicle controller 106 enables, based on the authorization information, access to an electronic component (e.g., the electronic component 108) of the vehicle 102 by an authorized repair entity to perform the automotive service. The authorized repair entity can be the repair facility 104 or can be a specific mechanic 110. The authorization information can further identify the authorized repair entity approved to perform the automotive service, where the enabling of the access of the electronic component is responsive to verifying that a repair entity attempting to perform the automotive service is the authorized repair entity identified by the authorization information. Additionally, the authorization information indicates a time interval during which the approval of the performance of the automotive service is valid.

Prior to enabling access to the electronic component 108 of the vehicle, the electronic component 108 (e.g., a diagnostic port) may be in a state that does not accept or respond to requests from an electronic device (e.g., 112 or 114 in FIG. 1) associated with the authorized repair entity. For example, the electronic component may ignore or discard requests for data or requests for access of further electronic components received from the electronic device associated with the authorized repair entity. Alternatively, to be able to access the electronic component 108, the electronic device associated with the authorized repair entity would have to provide a credential (e.g., a password, a passcode, etc.), a key, or any other information that the electronic component 108 uses to allow access of the electronic component 108. Enabling access of the electronic component 108 can refer to configuring the electronic component 108 to a state that accepts requests (from the electronic device associated with the authorized repair entity) to access data or further electronic components through the electronic component 108. Alternatively, enabling access of the electronic component 108 can refer to providing the electronic device associated with the authorized repair entity with information (e.g., a credential, a key, etc.) that can be submitted by the electronic device associated with the authorized repair entity to access the electronic component 108.

In some examples, the diagnostic port can be closed prior to the vehicle 102 receiving authorization from the automotive service authorization engine 122. The diagnostic port being "closed" refers to the diagnostic port not allowing access of the vehicle by an external entity, such as by the handheld electronic device 112 of the mechanic 110 or by the repair facility computer 114. When the diagnostic port is closed, no diagnostics or repairs on the vehicle 102 are allowed.

The checking of the context relating to the requested automotive service of the vehicle 102 can include a check based on location information in the context, a check on a timing of received messages, a check of an identity of a mechanic, a service type check, a check on an application program, a device, and/or a network, and so forth.

The checks are based on the expected context of the automotive service, including that the location of signaling received by the automotive service authorization engine 122 is from a known repair facility physical address, and during business hours of the repair facility 104.

1.1 Checks Based on Location Information

The following provides some examples of checks based on location information. There are a variety of sources of location information that the automotive service authorization engine 122 can use.

For example, location information may be reported by the vehicle 102, by the operator 116, and/or by the mechanic 110 in messaging with one another and/or with the automotive service authorization engine 122. In some examples, global position system (GPS) coordinates may be included in the messages. By including location information in the messages, online hackers who are not actually in the vicinity of the vehicle 102 or who do not know where the vehicle 102 may not be able to cause performance of an automotive service on the vehicle 102.

Instead of using GPS coordinates or other location information that provides a relatively precise location of the vehicle 102, approximate geographical location information of the vehicle 102, the operator 116, and/or the mechanic 110 may be obtained by the automotive service authorization engine 122 using a network address, such as an Internet Protocol (IP) address (e.g., a source IP address in a message sent by one of the above entities).

In further examples, current and historical location information of the vehicle 102 may be known to the automotive service authorization engine 122 through a number of mechanisms that are independent of a process relating to authorizing an automotive service. For example, location information (current and/or historical) of the vehicle 102 may be obtained using a navigation application program running in the vehicle 102 or on the handheld device 118 of the operator 116.

Location information relating to the mechanic 110 and/or the operator 116 may be obtained from a database of physical addresses associated with different people, including mechanics and vehicle owners.

Location information can also include location information of high-risk locations (e.g., locations associated with high crime rates). A database can store the location information of high-risk locations. The automotive service authorization engine 122 can access the database to determine whether the vehicle 102 is located in a high-risk area.

The automotive service authorization engine 122 can also access a database of device locations. This database stores location information that identifies locations of a device of a vehicle's operator (e.g., the handheld device 118). As an example, the operator's handheld device may be paired with the vehicle (such as over a Bluetooth connection, etc.). The locations of the operator's handheld device can be tracked, and information of such locations can be stored in the database of device locations. In such examples, the device location can provide an indication of the location of the vehicle 102. Alternatively, the device location retrieved from the database of device locations can be used to determine the location of the operator 116, which may be part of the automotive service authorization process.

A variety of location based checks can be made to authorize an automotive service on the vehicle 102.

For example, the automotive service authorization engine 122 can check to confirm that the operator 116, the mechanic 110, and/or the vehicle 102 are in the same location (approximate or precise).

As another example, the automotive service authorization engine 122 can check that the location of the operator 116 matches one or more of: the geographical location where the vehicle 102 spends the most stationary time (e.g., home or work or other), or the physical address of the mechanic 110 (including a mobile mechanic that comes to the location of the vehicle 102 to perform an automotive service).

As a further example, the automotive service authorization engine 122 can check that the locations of the mechanic 110 and/or the operator 116 match the physical address(es) on file for the mechanic 110 and/or the operator 116.

Moreover, the automotive service authorization engine 122 can check that the vehicle 102 is stationary at the time of a request to authorize an automotive service, especially if the request is to start work now or in a relatively short amount of time.

The automotive service authorization engine 122 can also check if any of the operator 116, the mechanic 110, and/or the vehicle 102 is in a high-risk location, such as based on accessing the database of high-risk locations. If so, the automotive service authorization engine 122 may deny the request to authorize the automotive service.

The automotive service authorization engine 122 can also check if the current reported location (of any of the operator 116, the mechanic 110, and/or the vehicle 102) is consistent with the last known reported location (of any of the operator 116, the mechanic 110, and/or the vehicle 102). If not, then the automotive service authorization engine 122 may deny the request to authorize the automotive service.

The automotive service authorization engine 122 can also check if the reported location of the vehicle 102 is on or near a road (where a legitimate mechanic 110 should be located.

1.2 Checks Based on Timing

The following describes examples of checks based on timings of received messages.

For example, the automotive service authorization engine 122 can check to determine if a message from the mechanic 110 (or more specifically, from a device of the mechanic 110) was received during open business hours (local time) of the mechanic 110 (or the repair facility 104).

As a further example, the automotive service authorization engine 122 can check if authentication/authorization messages from the vehicle 102, the operator 116, and the mechanic 110 were received within a given time window and in the expected order.

1.3 Checks Based on Other Information

The automotive service authorization engine 122 can also check an identity of the mechanic 110. For example, the automotive service authorization engine 122 can determine if the mechanic 110 has provided services to this vehicle 102 in the past, and/or if the mechanic 110 has been approved by the manufacturer of the vehicle 102. If the automotive service authorization engine 122 is unable to verify the identity of the mechanic 110 or if the mechanic 110 is not approved by the vehicle's manufacturer, then the requested automotive service can be denied.

The automotive service authorization engine 122 can also check the type of the automotive service that has been requested. The automotive service authorization engine 122 can check if the requested automotive service is recommended, such as based on health monitoring of the vehicle 102 by the manufacturer. If not, the automotive service authorization engine 122 can deny the automotive service request.

The automotive service authorization engine 122 can also check if the requested automotive service was recently performed on the vehicle 102. If so, the automotive service authorization engine 122 can deny the automotive service request.

The automotive service authorization engine 122 can also check if the requested automotive service is an expected service, such as based on manufacturer information for the vehicle 102. If not, the automotive service authorization engine 122 can deny the automotive service request.

The automotive service authorization engine 122 can also check an application program, a device, and/or a network involved in requesting an automotive service on the vehicle 102. For example, the automotive service authorization engine 122 can check if an application program used to perform authentication or authorization been used before by the operator 116 or the mechanic 110. If not, the automotive service authorization engine 122 can request second factor authentication as discussed further below.

The automotive service authorization engine 122 can also check if a device used by the operator 116 or the mechanic 110 has been used in the past. If not, then that may indicate that the requester of the automotive service is an unauthorized person pretending to be the operator 116 or the mechanic 110, and in response, the automotive service authorization engine 122 can deny the automotive service request.

The automotive service authorization engine 122 can check if a network (e.g., derived from a source IP address) used in sending a request for an automotive service has been used before, by any of the parties. Also, the automotive service authorization engine 122 can determine a reputation of the network. If the network has not previously been used and/or the network has a low reputation (i.e., the network may not be trusted), then the automotive service authorization engine 122 can deny the automotive service request.

2. Second Factor Authentication

Figure 3:
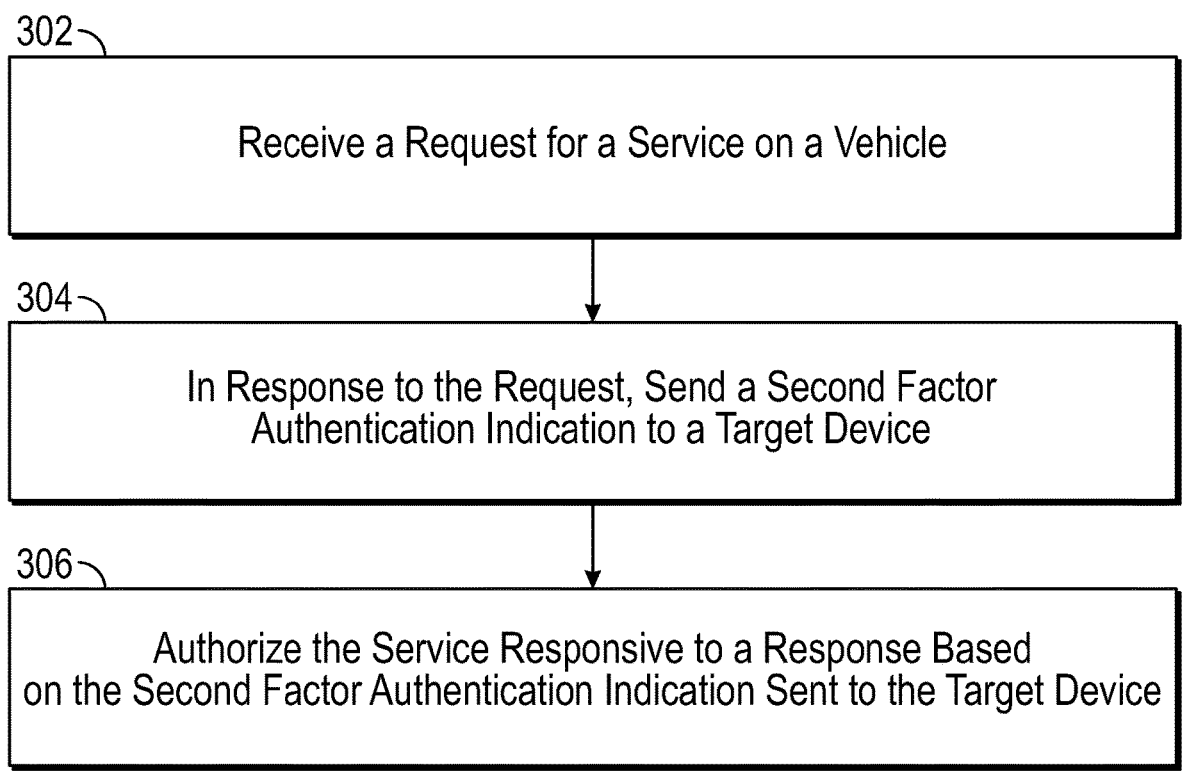

In further examples, a second factor authentication process can be performed by the automotive service authorization engine 122. FIG. 3 is a flow diagram of the second factor authentication process 300 according to some examples. Although FIGS. 2 and 3 show the context-based authentication process 200 and the second factor authentication process 300 as being separate processes, it is noted that in further examples, an authorization process can employ both a context-based check and a second factor check.

The automotive service authorization engine 122 receives (at 302) a request for an automotive service on the vehicle 102.

In response to the request, the automotive service authorization engine 122 sends (at 304) a second factor authentication indication to a target device, which can be the vehicle controller 106 or the handheld electronic device 118 of the operator 116. The second factor authentication indication causes a prompt to be displayed at the target device, where the prompt is to request a user at the target device to take a specified action, such as scan a displayed barcode or Quick Response (QR) code, enter a code into a text box or other input field, activate an element (e.g., a hyperlink, a program, an icon, etc.), and so forth.

The automotive service authorization engine 122 authorizes (at 306) the automotive service responsive to a response based on the second factor authentication indication sent to the target device. The response based on the second factor authentication indication can include the code entered by the user at the target device, an indication that the user has activated the specified element, or an indication of any other specified action that the user is supposed to perform to verify that the requested automotive service is to be performed.

In some examples, authorization of an automotive service can be based on a context-based authentication process (e.g., 200 in FIG. 2) as well as a token-based authentication, such as described in U.S. application Ser. No. 16/868,808, entitled "Authorization of Vehicle Repairs," filed May 7, 2020.

The token-based authentication can involve the operator 116 issuing a first authorization token for the automotive service, and the server system 120 associated with the vehicle manufacturer issuing a second authorization token for the automotive service. For example, the operator 116 (or the electronic device, e.g., 118, associated with the operator 116) provides, directly to the vehicle 102 (more specifically, the vehicle controller 106), authorization information (e.g., a digital authorization token), so that vehicle controller 106 can verify authorization information (e.g., an authorization token) that the mechanic 110 presents to the vehicle controller 106.

The second authorization token is used by the vehicle manufacturer to grant authorization for a particular mechanic to perform the automotive service within a certain period of time ("authorization time window"). The authorization granted by the vehicle manufacturer can be instantiated as the second authorization token sent by cloud (e.g., the server system 120) to the mechanic's device (e.g., the handheld device 112 or the repair facility computer 114).

In some examples, assuming that the token-based authentication is successful, the automotive service authorization engine 122 of the server system 120 can perform the context-based authentication process discussed further above, which can be based on location information, time information, and/or further information.

Note that even if the token-based authentication completed successfully, the context-based authentication may fail. If the context-based authentication fails, then the second factor authentication process (e.g., 300 in FIG. 3) can be performed to determine whether or not the requested automotive service can proceed. The second factor authentication provides further confidence among the parties (vehicle manufacturer, the vehicle 102, the operator 116, and the mechanic 110) regarding authorization of the automotive service.

In the above examples, the second factor authentication process is performed with the token-based authentication and the context-based authentication. In other examples, the context-based authentication and the second factor authentication process can be performed without the token-based authentication. Generally, the second factor authentication may only be conditionally applied, for example, such as when the context-based authentication fails.

Figure 4:
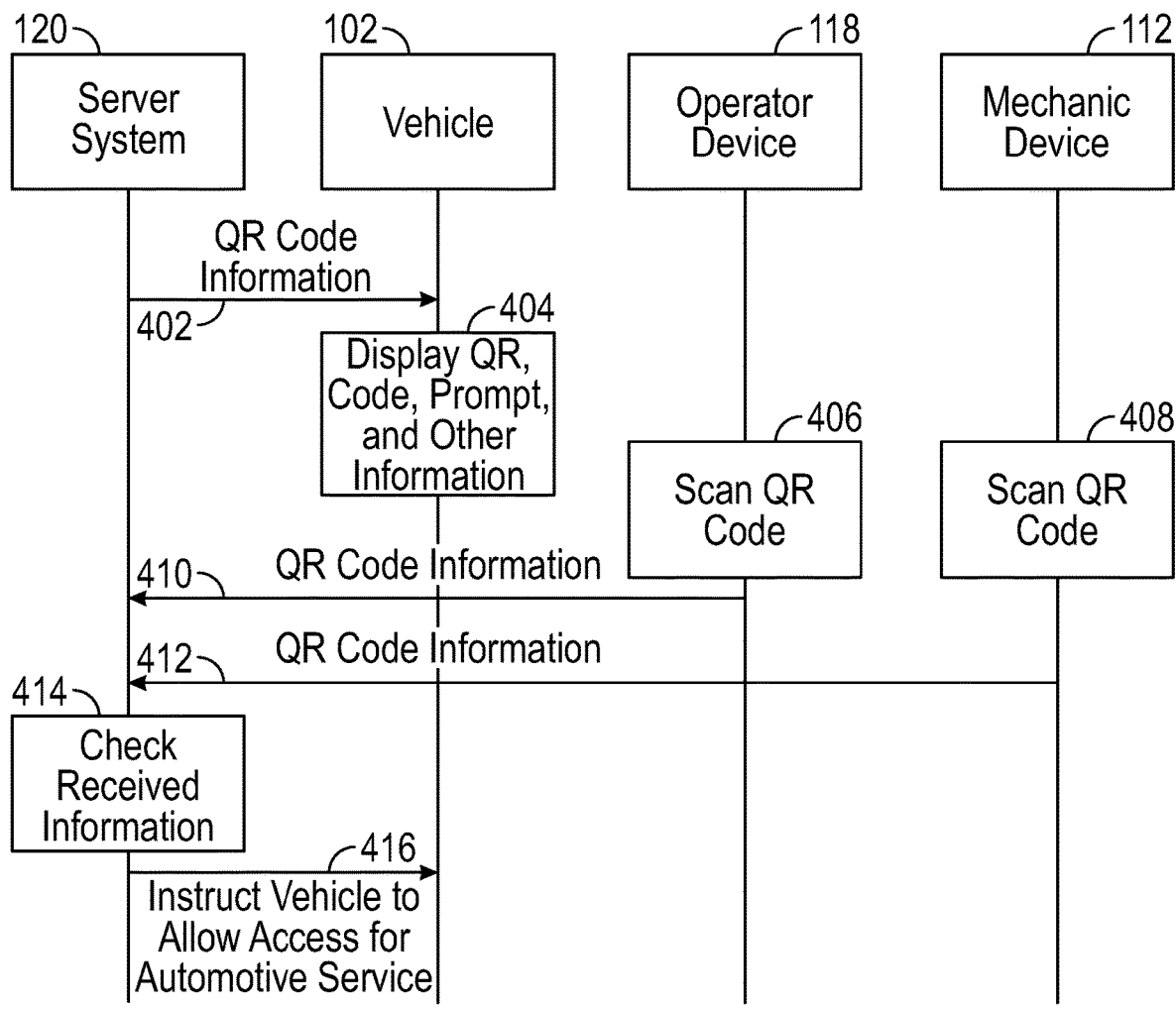
FIGS. 4 and 5 are message flow diagrams for perform second factor authentication, according to some implementations of the present disclosure.

In some implementations, a second factor authentication process can be performed with respect to both the operator 116 and the mechanic 110. In some examples, as shown in FIG. 4, the server system 120 (e.g., the automotive service authorization engine 122) sends (at 402) information relating to a unique QR code to the vehicle 102. In response to receiving the information relating to the QR code, the vehicle 102 displays (at 404) (e.g., in the heads up display or infotainment unit). The vehicle 102 can also display information about the requested automotive service, and can display a prompt that may ask the operator 116 and the mechanic 110, if they approve of the automotive service, to scan the QR code using a specified application on the operator's and mechanic's devices, respectively.

Although FIG. 4 depicts a sequence of tasks, it is noted that the tasks can be performed in a different sequence or alternate tasks may be performed.

The operator 116 uses the handheld device 118 to scan (at 406) the displayed QR code, such as by using an open application on the handheld device 118. The mechanic 110 uses the handheld device 112 to scan (at 408) the displayed QR code, such as by using an open application on the handheld device 112.

In response to scanning (at 406) the QR code, the operator's handheld device 118 sends (at 410) information related to the QR code (including the QR code itself) back to the automotive service authorization engine 122. Similarly, in response to scanning (at 408) the QR code, the mechanic's handheld device 112 sends (at 412) information related to the QR code (including the QR code itself) back to the automotive service authorization engine 122.

The automotive service authorization engine 122 can then check (at 414) the received information from the devices 118 and 112. The check can include verifying that the information was received at around the same time (e.g., within a specified time threshold of one another), and that the received information matches expected information (e.g., matches the QR code that was sent). If the check is successful, the automotive service authorization engine 122 can then instruct (at 416) the vehicle 102 to allow access for the automotive service, in a specified time window and at a specified location.

In this way, for the operator 116 to grant authorization for work to be performed, besides having authorized the service via the server system 120, the operator 116 has to be near or at the vehicle 102, so that the operator 116 can respond to a second factor authentication request that is sent by the server system 120 to the vehicle 102.

The second factor authentication process can prevent an online hacker from being able to grant authorization (e.g., to prevent hackers from making malicious software updates).

The second factor authentication process can also mitigate against the risk that a vehicle is stolen and then taken to be serviced with a service pack that will allow further malicious activity by the attacker.

Similarly, the mechanic 110 may have to prove that the mechanic 110 is in the vicinity of the vehicle 102 by responding to a second factor authentication request that is sent to the vehicle 102. This prevents an online hacker from being able to gain authorization to make malicious software updates.

Instead of QR codes, NFC, Bluetooth, or WiFi-Direct (or WiFi Easy Connect) communications can be used between the vehicle's infotainment system and the mechanic's device (112 or 114) and the operator's device (118). In such communications, security data is transmitted from the vehicle 102 to the device(s) and/or vice-versa. The recipient of the data sends the data to the server system 120, which can use the data to decide whether the requested automotive service is approved.

Figure 5:
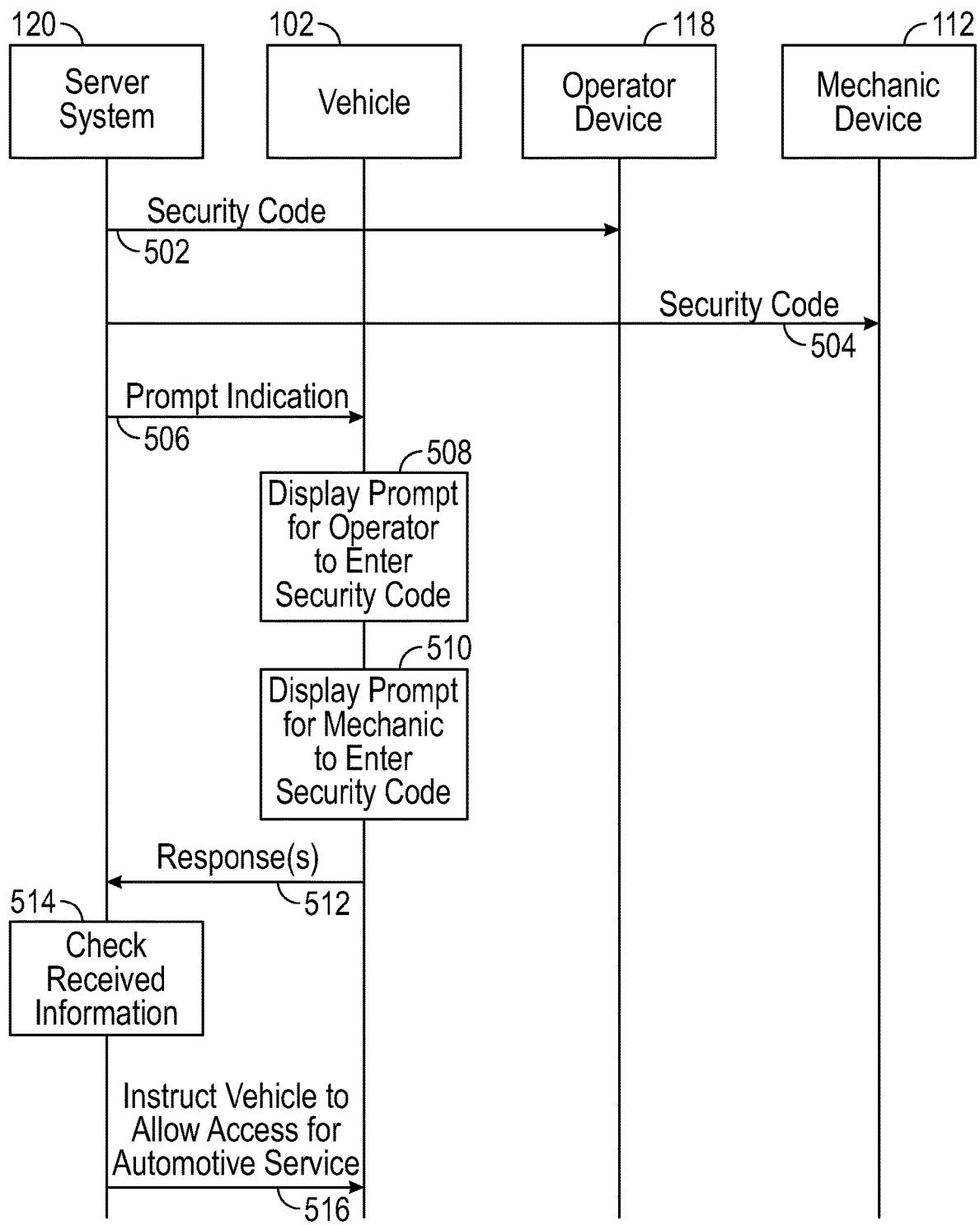

FIG. 5 is a message flow diagram showing another example of second factor authentication. Although FIG. 5 depicts a sequence of tasks, it is noted that the tasks can be performed in a different sequence or alternate tasks may be performed.

The server system 120 (e.g., the automotive service authorization engine 122) sends (at 502) a first security code to the operator's handheld device 118. An application in the operator's handheld device 118 can display the first security code, which can be a numeric string, an alphanumeric string, or a string of letters. Similarly, the server system 120 (e.g., the automotive service authorization engine 122) sends (at 504) a second security code to the mechanic's handheld device 112. An application in the mechanic's handheld device 112 can display the second security code. The first security code and the second security code can be the same or different.

The server system 120 (e.g., the automotive service authorization engine 122) also sends (at 506) a prompt indication to the vehicle 102, which causes the vehicle 102 to display (at 508) a prompt for the operator 116 to enter the first security code, and to display (at 510) a prompt for the mechanic 110 to enter the second security code.

Note that the prompt for the operator 116 and the mechanic 110 can be in different display window screens, or in the same display window screen.

Responsive to the operator 116 and the mechanic 110 entering their respective security codes, the vehicle 102 sends (at 512) one or more responses to the server system 120. The response(s) can include the security codes entered by the operator 116 and the mechanic 110, respectively.

The server system 120 checks (at 514) whether the received information in the response(s) matches expected information (e.g., the received security codes match expected security codes). If the check is successful, the automotive service authorization engine 122 can then instruct (at 516) the vehicle 102 to allow access for the automotive service, in a specified time window and at a specified location.

3. System Architecture

Figure 6:
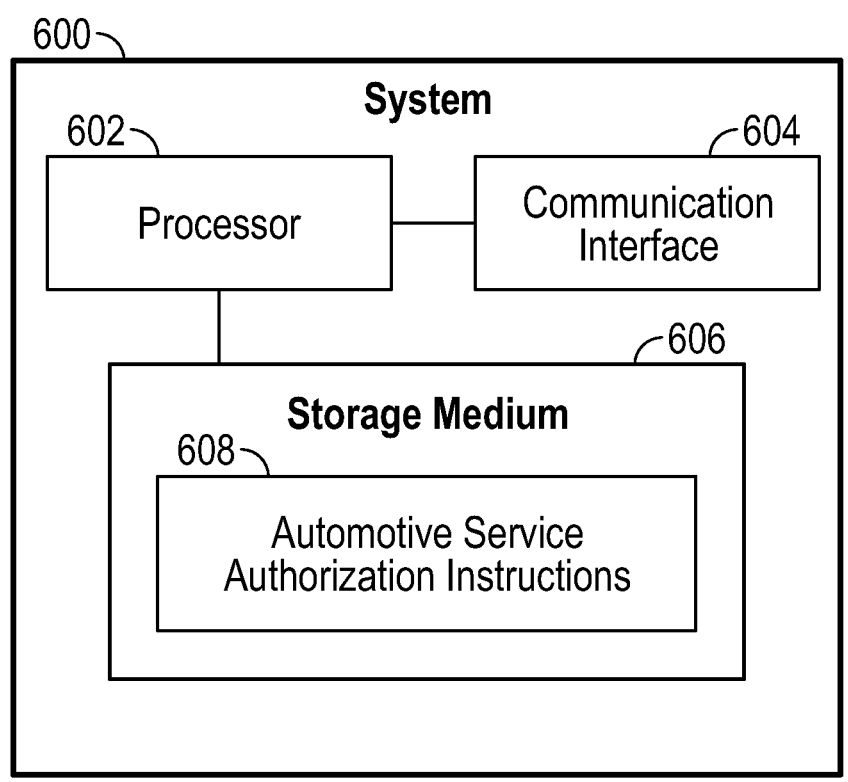
FIG. 6 is a block diagram of a system according to some implementations of the present disclosure.

FIG. 6 is a block diagram of an example system 600, which can be the server system 120, for example. The system 600 includes one or more hardware processors 602. A hardware processor can include a microprocessor, a core of a multi-core microprocessor, a microcontroller, a programmable integrated circuit, a programmable gate array, a digital signal processor, or another hardware processing circuit.

The system 600 includes a communication interface 604 to communicate over a network, such as a wireless network or a wired network. The communication interface 604 includes a transceiver to transmit and receive signals over the network, and one or more protocol layers that control the transmission and reception of the messages or frames according to corresponding one or more protocols.

The system 600 includes a non-transitory machine-readable or computer-readable storage medium 606 to store machine-readable instructions that are executable on the one or more hardware processors 602 to perform any of various tasks discussed above. The machine-readable instructions can include automotive service authorization instructions 608 to perform authorizations for supporting automotive services on vehicles (such as those tasks of the automotive service authorization engine 122 of FIG. 1).

In some examples, the automotive service authorization instructions 608 can determine a context relating to a requested service of a vehicle, the context comprising information of a location related to the vehicle. The automotive service authorization instructions 608 authorizes the requested service based on the determined context.

In some examples, the information of the location related to the vehicle includes information of a location of the vehicle, and where the authorizing is based on a determination that the vehicle is at an expected location based on the information of the location of the vehicle.

In some examples, the information of the location related to the vehicle includes information of a location of an operator of the vehicle, where the authorizing is based on a determination that the operator is at an expected location based on the information of the location of the operator.

In some examples, the information of the location related to the vehicle includes information of a location of a mechanic that is to perform the requested service on the vehicle, where the authorizing is based on a determination that the mechanic is at an expected location based on the information of the location of the mechanic.

In some examples, the information of the location related to the vehicle includes information of a location of a device of an operator of the vehicle, where the device is paired with the vehicle.

In some examples, the authorizing is further based on the context indicating that the vehicle, an operator of the vehicle, and a mechanic to perform the requested service are at a same location.

In some examples, the context further includes an identity of a mechanic to perform the requested service, and the authorizing is further based on whether the mechanic identified by the identity is approved.

In some examples, the automotive service authorization instructions 608 determines whether the service is authorized based on the context, and in response to determining that the service cannot be authorized based on the context, the automotive service authorization instructions 608 performs a second factor authentication. The authorizing of the requested service is based on the second factor authentication after determining that determining that the service cannot be authorized based on the context.

In some examples, the second factor authentication includes sending information to the vehicle for display at the vehicle, and receiving a scanned version of the displayed information (e.g., displayed QR code) from a device used to scan the displayed information.

In some examples, the second factor authentication includes sending a security code to a device of an operator of the vehicle, and receiving the security code entered by the operator in an input device of the vehicle.

A storage medium (e.g., 606) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   determining, by a system comprising a hardware processor, a context relating to a requested service of a vehicle, the context comprising information of a location of the vehicle and a location of a mechanic;
   authorizing, by the system, the requested service based on the determined context, the authorizing comprising a location-based check performed by machine-readable instructions executed in the system using the location of the vehicle and the location of the mechanic;
   in response to authorizing the requested service that comprises the location-based check performed by the machine-readable instructions using the location of the vehicle and the location of the mechanic, changing a state of an on-board diagnostic port of the vehicle from a closed state to an open state to accept access from an external device as part of performing the requested service, wherein when the on-board diagnostic port is closed the on-board diagnostic port does not allow access of the vehicle by an external entity;
   determining whether the requested service is authorized based on the context; and
   in response to determining that the requested service cannot be authorized based on the context, performing a second factor authentication,
   wherein the authorizing of the requested service is based on the second factor authentication after determining that determining that the requested service cannot be authorized based on the context.

2. The method of claim 1, wherein the second factor authentication comprises:
   sending information to the vehicle for display at the vehicle, and
   receiving a scanned version of the displayed information from a device used to scan the displayed information.

3. The method of claim 2, wherein the displayed information displayed in a display device of the vehicle comprises a Quick Response (QR) code.

4. The method of claim 1, wherein the second factor authentication comprises:
   sending a security code to a device of an operator of the vehicle, and
   receiving the security code entered by the operator in an input device of the vehicle.

5. The method of claim 1, wherein the second factor authentication comprises:
   sending a security code to a device of the mechanic to perform the requested service, and
   receiving the security code entered by the mechanic in an input device of the vehicle.

6. A non-transitory machine-readable storage medium comprising instructions that upon execution cause a system to:
   receive a request for a service on a vehicle;
   in response to the request, attempt to authorize the service using a location-based check performed by the instructions executed in the system based on information of a location related to the vehicle and information of a location of a mechanic to service the vehicle;
   in response to being unable to authorize the service using the location-based check performed by the instructions executed in the system based on the information of the location related to the vehicle and the information of the location of the mechanic, send a second factor authentication indication to a target device;
   authorize the service responsive to a response based on the second factor authentication indication sent to the target device; and
   in response to authorizing the service responsive to the response based on the second factor authentication indication, change a state of an on-board diagnostic port from a closed state to an open state of the vehicle to accept access from an external device as part of performing the service, wherein when the on-board diagnostic port is closed the on-board diagnostic port does not allow access of the vehicle by an external entity.

7. The non-transitory machine-readable storage medium of claim 6, wherein the location-based check comprises comparing the location of the mechanic to a target physical location of the mechanic.

8. The non-transitory machine-readable storage medium of claim 6, wherein the on-board diagnostic port remains closed to prevent performance of the service in response to the service not being authorized.

9. The non-transitory machine-readable storage medium of claim 6, wherein the target device to which the second factor authentication indication is sent is an electronic device of the mechanic to perform the service.

* * * * *